United States Patent
Delp et al.

(10) Patent No.: US 7,370,519 B2
(45) Date of Patent: May 13, 2008

(54) DEVICE AND METHOD FOR DETECTING MALFUNCTIONS IN A FUEL INJECTION SYSTEM PROVIDED WITH A FUEL PRESSURE DAMPER

(75) Inventors: Matthias Delp, Regensburg (DE); Gerhard Eser, Hemau (DE)

(73) Assignee: Siemens Aktiengesellschaft, Munich (DE)

( * ) Notice: Subject to any disclaimer, the term of this patent is extended or adjusted under 35 U.S.C. 154(b) by 143 days.

(21) Appl. No.: 10/512,770

(22) PCT Filed: Nov. 21, 2003

(86) PCT No.: PCT/DE03/03872

§ 371 (c)(1),
(2), (4) Date: Jan. 3, 2006

(87) PCT Pub. No.: WO2004/070183

PCT Pub. Date: Aug. 19, 2004

(65) Prior Publication Data

US 2006/0150723 A1    Jul. 13, 2006

(30) Foreign Application Priority Data

Feb. 10, 2003  (DE) ............................... 103 05 372

(51) Int. Cl.
*G01M 15/00* (2006.01)

(52) U.S. Cl. .................................. 73/119 A

(58) Field of Classification Search .................. 73/115, 73/116, 117.2, 117.3, 118.1, 119 A, 49.7, 73/119 R
See application file for complete search history.

(56) References Cited

U.S. PATENT DOCUMENTS

| 6,223,724 B1* | 5/2001 | Miyaji et al. ............... 123/446 |
| 6,223,725 B1* | 5/2001 | Onishi et al. ............... 123/447 |
| 6,848,477 B2* | 2/2005 | Treusch et al. ............... 138/44 |
| 2003/0164161 A1* | 9/2003 | Usui et al. ................... 123/510 |
| 2003/0230282 A1* | 12/2003 | Braun et al. ................. 123/456 |
| 2005/0039725 A1* | 2/2005 | Treusch et al. ............. 123/456 |

FOREIGN PATENT DOCUMENTS

| DE | 199 46 506 C1 | 7/2001 |
| DE | 101 08 175 C1 | 7/2002 |
| DE | 101 46 474 A1 | 4/2003 |
| EP | 1 262 658 A2 | 12/2002 |
| WO | WO 01/29411 A1 | 4/2001 |

* cited by examiner

*Primary Examiner*—Eric S. McCall
(74) *Attorney, Agent, or Firm*—Laurence A. Greenberg; Werner H. Stemer; Ralph E. Locher

(57) ABSTRACT

In the low pressure zone (10) of a fuel injection system a fuel pressure damper (12) is provided which dampens pressure variations, especially such pressure variations that are caused by operation of a high-pressure fuel pump (16) mounted downstream of the low pressure zone (10). In the low pressure zone (10), the pressure profile is detected by a pressure sensor (14). The high-frequency components of the pressure profile detected by the pressure sensor (14) can be used to ascertain whether the fuel pressure damper (12) functions properly.

19 Claims, 4 Drawing Sheets

DEVICE AND METHOD FOR DETECTING MALFUNCTIONS IN A FUEL INJECTION SYSTEM PROVIDED WITH A FUEL PRESSURE DAMPER

CLAIM FOR PRIORITY

This application is a national stage of PCT/DE2003/003872, published in the German language on Aug. 19, 2004, which claims the benefit of priority to German Application No. DE 103 05 372.7, filed on Feb. 10, 2003.

This application claims the benefit of priority to German Application No. EP 020 05 509.1, filed on Mar. 11, 2002, the contents of which are hereby incorporated by reference in its entirety.

TECHNICAL FIELD OF THE INVENTION

The invention relates to a device for detecting malfunctions in a fuel injection system and to a method for detecting malfunctions in a fuel injection system and to a motor vehicle having a device for detecting malfunctions in a fuel injection system and a diagnostic system having a device for detecting malfunctions in a fuel injection system.

BACKGROUND OF THE INVENTION

In the context of the present disclosure, the fuel injection systems concerned are used for injecting fuel into the cylinders of an internal combustion engine.

Without restricting its generality, the description of the state of the art and the invention based on it will refer to a high-pressure injection system, although these problems with the state of the art, and their solution according to the invention, also arise or have an effect in low-pressure injection.

A fuel injection system which works at a high-pressure is generally equipped with a fuel store ("rail"), which is filled with fuel by a high-pressure pump, and is thereby brought up to the pressure level required for high-pressure injection. The high-pressure pump itself is supplied with fuel by a low-pressure fuel pump which takes the fuel out of a fuel tank. From the fuel store, the fuel is introduced into the interior of the cylinder via injection valves.

In general, various measures can be adopted for controlling or regulating the fuel injection system. For example, in the low-pressure zone mechanical regulators can be used with return lines to the tank, and also regulating valves in the high-pressure zone.

Pressure pulsations in the low-pressure circuit are a problem. In the case of high-pressure fuel injection systems, these result primarily from the operation of the high-pressure pump, which is generally designed as a single-piston pump. But with low-pressure injection systems too, pulsations of this type can arise, for example from the injection operation. In order to attenuate these pulsations, in the low-pressure zone use can be made of a fuel pressure damper which, for example, is realized as a spring-loaded membrane. In general, a fuel pressure damper provides a compressible medium which absorbs pressure peaks and evens out pressure troughs, thus functioning overall as a buffer.

In the event of faults in the fuel pressure damper, in particular mechanical faults, pressure drops can occur in the low-pressure circuit. This can have a negative effect on the engine power, the emission values for the engine, and other parameters linked with the operation of the internal combustion engine.

SUMMARY OF THE INVENTION

The invention relates to a device for detecting malfunctions in a fuel injection system, where the fuel injection system includes a low-pressure zone, a fuel pressure damper located in the low-pressure zone, and at least one pressure sensor for detecting the pressure prevailing in the low-pressure zone.

The invention further relates to a method for detecting malfunctions in a fuel injection system, where the fuel injection system includes a low-pressure zone, a fuel pressure damper located in the low-pressure zone, and at least one pressure sensor for detecting the pressure prevailing in the low-pressure zone.

The invention further relates to a motor vehicle having a device for detecting malfunctions in a fuel injection system and a diagnostic system having a device for detecting malfunctions in a fuel injection system.

The invention seeks to develop the devices and methods of the state of the art in such a way as to solve the problems outlined, in particular by detecting and preferably remedying problems caused by a faulty fuel pressure damper.

In one embodiment of the invention, a malfunction of the fuel pressure damper can be detected by reference to a high-frequency component of a first signal, provided by a pressure sensor, which characterizes the time-trace of the pressure in the low-pressure zone. If the fuel pressure damper is functionally sound, the high-frequency components of the time-trace of the pressure in the low-pressure zone are well damped, so the high-frequency component can be used to determine whether the fuel pressure damper is functionally sound. If the high-pressure pressure oscillations exceed certain prescribed limiting values, then it is very probable that the fuel pressure damper is faulty.

In one aspect, it is advantageous to develop the device in accordance with the invention so that the first signal can be low-pass filtered, to produce a low-pass filtered second signal, and so that a third signal is generated as the absolute difference between the first and second signals, and so that this third signal can be compared with a prescribed threshold value, whereby if this threshold value is exceeded it can be concluded that the fuel pressure damper is malfunctioning. Initially, therefore, the pressure/time trace is low-pass filtered. By forming the difference between this low-pass filtered signal and the original signal, and the absolute value of this difference, a third signal is obtained, the amplitude of which has an absolute significance, so that it can be compared with a prescribed threshold value. The simple operations described, such a low-pass filtering and the formation of a difference, can be simply implemented in a conventional controller, for example an engine management unit.

In another aspect of the invention, the first signal can be subject to a Fourier transformation, to generate a frequency spectrum corresponding to the time-trace of the first signal, and so that high-frequency components of the frequency spectrum can be compared with at least one prescribed threshold value, whereby it can be concluded that there is a malfunction of the fuel pressure damper if the threshold value(s) is (are) exceeded. The analysis of the high-frequency component of the pressure/time graph will be carried out, for example, as part of an FFT ("fast Fourier transform"), so that an analysis method which is known per se can be utilized for the analysis.

The device in accordance with the invention is particularly advantageous in those cases where the fuel injection system has a high-pressure fuel pump and a high-pressure zone with a fuel store. Since the fuel pressure damper is particularly able to smooth pressure fluctuations created by a high-pressure pump, the device in accordance with the invention is specially suited to use in a high-pressure fuel injection system.

It is beneficial to provide for any fuel pressure damper malfunction which is detected to be stored in a fault memory. This enables any faulty operation of the fuel pressure damper to be recognized, or to be brought to attention, during repair work or routine maintenance on the vehicle. It is also conceivable that the content of the fault memory is indicated to the driver of the vehicle via an on-board computer.

It can be especially beneficial if the detection of a fuel pressure damper malfunction is able to take into account the operating conditions of the internal combustion engine. For example, critical operating conditions may exist at low load, because in this case the high-pressure pump feeds back to the low-pressure zone a large volume of fuel. On the other hand, for purely low-pressure systems the detection of malfunctions is largely independent of the operating conditions of the internal combustion engine.

The device in accordance with another embodiment of the invention can also be advantageously developed by providing at least one electronic controller which is assigned to the fuel injection system, and in which at least one of the analyses mentioned above can be carried out. In particular, the various threshold value comparisons, the filtering, the formation of the differences and the Fourier transformation can be carried out on a digital basis in the electronic control unit of the fuel injection system, or in the engine management unit, as appropriate. On the other hand, it is also conceivable that parts of the analysis are realized by analog circuit technology. Furthermore, parts of the analyses mentioned can be undertaken in other control units in a vehicle, or by another device, as appropriate, with these components being able to communicate with the fuel injection system controller, in particular, via a data bus.

It is beneficial if the device is designed so that it has an interface for its installation into a vehicle. The detection of malfunctions can thus be carried out in the vehicle itself. Faults which are detected can be stored in a fault memory, and the engine management unit can react appropriately to the faults which are present.

In addition or alternatively, however, the device can also be provided with an interface for its installation in a diagnostic facility which is separate from the vehicle. The device can thus also be used in the context of vehicle diagnosis in a workshop.

In another embodiment of the invention, there is a method which includes sensing of a pressure/time trace in the low-pressure zone, generation of a first signal which characterizes the pressure/time trace in the low-pressure zone and analysis of a high-frequency component of the first signal in order to detect from this any malfunction of the fuel pressure damper.

In doing this, a particularly advantageous embodiment of the method in accordance with the invention is that the first signal is low-pass filtered, to generate a low-pass filtered second signal, that a third signal is generated as the absolute difference between the first and second signals, and that the third signal is compared with a prescribed threshold value, whereby if this threshold value is exceeded it can be concluded that the fuel pressure damper is malfunctioning.

It can also be beneficial that the first signal is subjected to a Fourier transformation, to produce a frequency spectrum corresponding to the time-trace of the first signal, and that high-frequency components of the frequency spectrum are compared with at least one prescribed threshold value, whereby if the threshold value(s) is (are) exceeded it can be concluded that the fuel pressure damper is malfunctioning.

The method in accordance with the invention is particularly advantageous when the fuel injection system has a high-pressure fuel pump and a high-pressure zone with a fuel store.

A further beneficial development of the method is to store any operational fault which is detected in the fuel pressure damper in a fault memory.

Also, it is advantageous if the method is organized so that the detection of an operational fault in the fuel pressure damper can take into account the operating conditions of the internal combustion engine.

Furthermore, the method in accordance with the invention will benefit from the provision of at least one electronic control unit, assigned to the fuel injection system, in which at least one of the above-mentioned analyses is carried out.

In another embodiment, the method can also be usefully developed in that, when an operational fault is detected in the fuel pressure level, emergency operating measures are initiated, in particular a limit on the rotational speed and/or a reduction in the fuel pressure level. Such emergency operating measures can, for example, avert consequential damage to the vehicle and/or excessive emissions, so that the vehicle can still be driven at least as far as a workshop, for the fault to be remedied there.

The invention further relates to a vehicle with a device in accordance with the invention which is in particular suitable for carrying out a method in accordance with the invention.

The invention also relates to a diagnostic facility with a device in accordance with the invention which is in particular suitable for carrying out a method in accordance with the invention.

Underlying the invention is the recognition that it is possible to determine that there is a fault, in particular a mechanical fault, in the fuel pressure damper, from the pressure/time trace in the low-pressure zone. The high-frequency components which are, for example, generated by the operation of the high-pressure pump are excessive when there is a fault in the fuel pressure damper, so that it is possible, by sensing these high-frequency components and by an appropriate analysis, to draw conclusions about the failure of a fuel pressure damper.

BRIEF DESCRIPTION OF THE DRAWINGS

The invention will now be explained in detail below with reference to the drawings, in which.

DETAILED DESCRIPTION OF THE INVENTION

Figure 1:
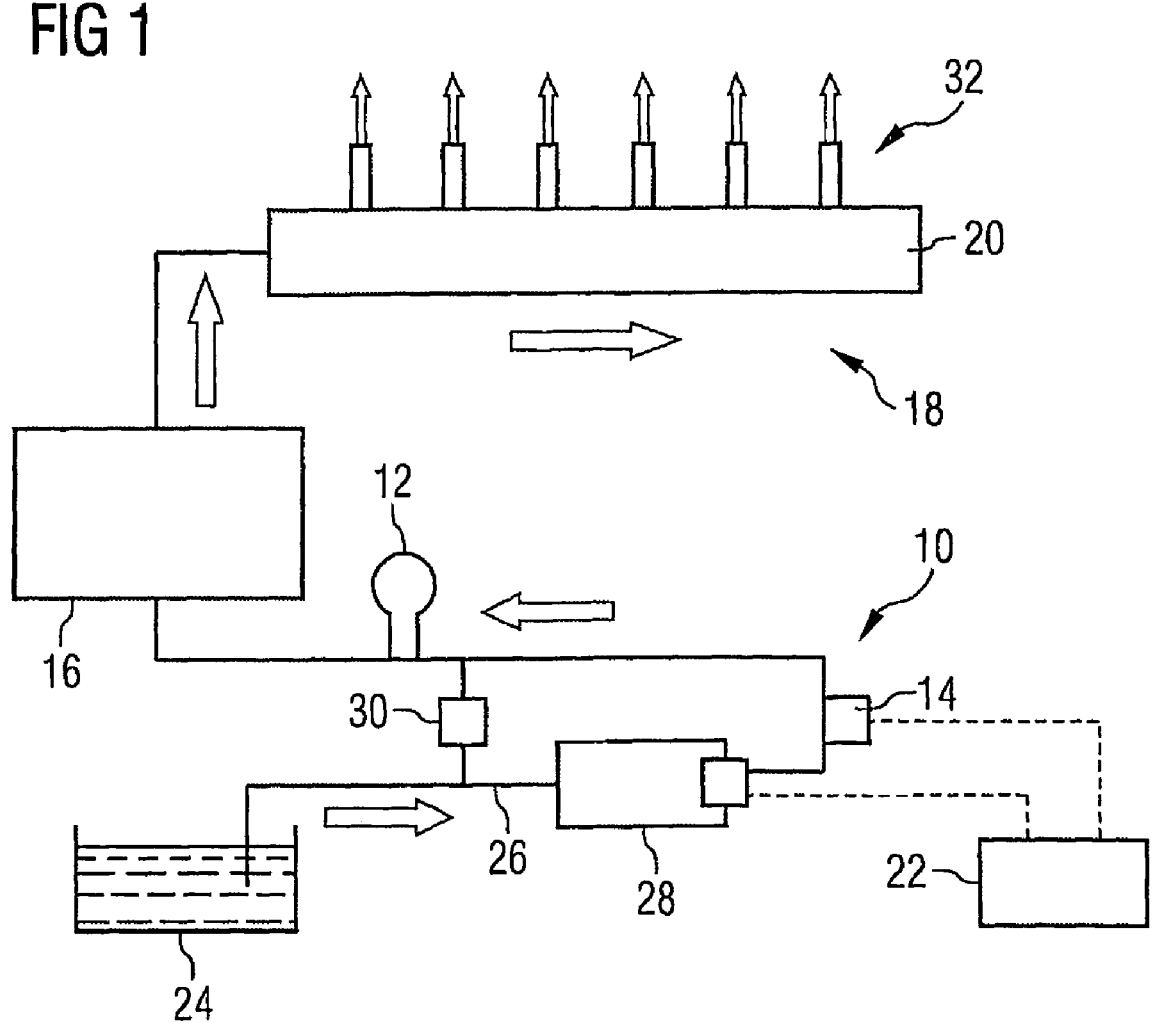
FIG. 1 shows a fuel injection system.

FIG. 1 shows a schematic diagram of a fuel injection system. Fuel is conveyed from a fuel tank 24 via a fuel line 26 by means of a low-pressure pump 28. The low-pressure pump 28 supplies fuel to a low-pressure zone 10. The pressure in this low-pressure zone 10 can be controlled or regulated, as applicable, by an electronic control unit 22. For this purpose, the low-pressure zone 10 has a pressure sensor 14 which supplies pressure data to the electronic control unit 22. The electronic control unit 22 can influence the operation of the low-pressure pump 28, in particular on the basis of the signals supplied by the pressure sensor 14. Furthermore, an overpressure limiting valve 30 is provided, through which fuel can flow back to the low-pressure zone of the low-pressure pump 28. The main path for the fuel from the low-pressure pump 28 leads to a high-pressure fuel pump 16. This high-pressure fuel pump 16 feeds the fuel into a high-pressure zone 18, and in particular into a fuel store 20 (the "rail"). The fuel store 20 is equipped with injectors or injection valves 32, as applicable, which can introduce the fuel into the interiors of the cylinders. As the high-pressure fuel pump 16 is, in particular, arranged as a continuous-operation pump, for example as a single piston high-pressure pump, measures are generally taken to adjust the pressure in the fuel store 20 as required. This can be effected, for example, by a fuel regulation valve (not shown), through which any difference in the fuel conveyed by the high-pressure fuel pump 16 and the fuel introduced into the cylinders by the injection valves 32 flows back into the low-pressure zone 10. Such a fuel pressure regulation valve on the high-pressure zone 18 can be controlled by an electronic controller, the input values to which include (among others) a value determined by a pressure sensor (not shown) on the fuel store 20. This enables the regulation of the injection pressures to be effected by the fuel pressure regulation valve, depending on its actuation by the electronic controller, allowing more or less fuel to flow back to the low-pressure zone. The electronic controller can be arranged as a separate controller, but it may also be integrated with the electronic controller 22, for example in an engine management unit.

The low-pressure zone 10 has in addition a fuel pressure damper 12. This serves to attenuate pressure pulsations which arise in the low-pressure zone 10, in particular due to the operation of the high-pressure fuel pump 16.

The use of such a fuel pressure damper is also appropriate for low-pressure systems because here too pressure fluctuations can arise, for example due to the fuel injection, which should preferably be damped. However, without restricting the generality, the invention is explained for a high-pressure fuel injection system.

If a fault should arise, in particular a mechanical fault in the fuel pressure damper 12, then pressure interruptions may result in the low-pressure zone 10 due to the severe pressure fluctuations. Ultimately this will have a negative effect on the functioning of the internal combustion engine, for example in respect to its power and its emission values. For this reason, it is appropriate to react to any such fault in the fuel pressure damper 12, and for this purpose the fault is first detected. To do so, the presence of the pressure sensor 14 in the low-pressure zone 10 is exploited. If inadequate pressure damping is recognized by means of the pressure sensor 14, it is then possible to initiate measures, and in particular countermeasures, which could for example includes entering the fault into a fault memory, a reduction in the pressure level, and a limitation of the rotation speed. The recognition of excessive pressure fluctuations will be effected by reference to a high-frequency component of the signals provided by the pressure sensor 14, which will be explained in more detail below.

Figure 2:
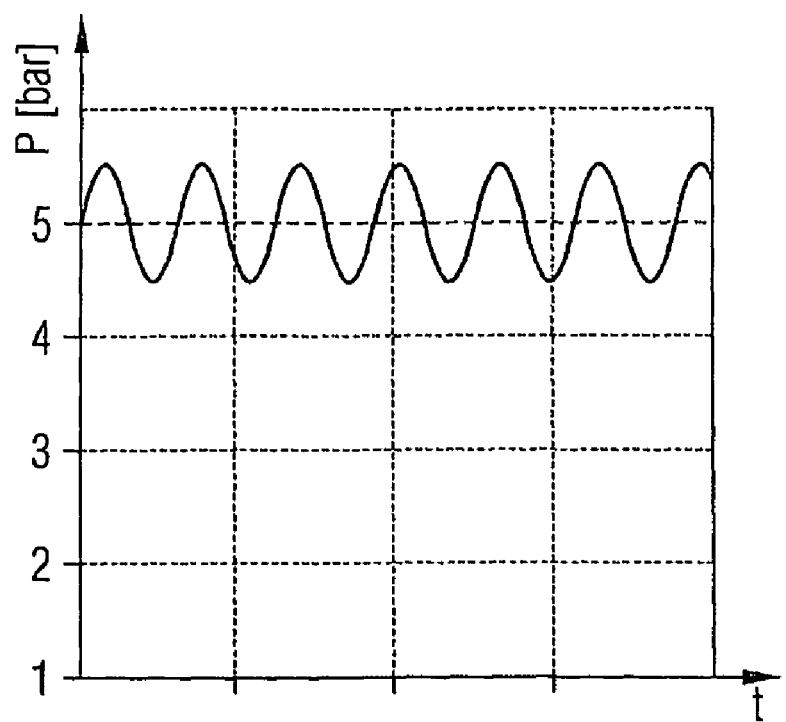
FIG. 2 shows a time-trace of the fuel pressure in the low-pressure zone when the fuel pressure damper is working correctly.

FIG. 2 shows a time-trace of the fuel pressure in the low-pressure zone when the fuel pressure damper is working correctly. The pressure fluctuates with an amplitude of approx. +/−0.5 bar about a mean pressure value of 5 bar. This is achieved by the fuel pressure damper 12 providing satisfactory pressure smoothing.

Figure 3:
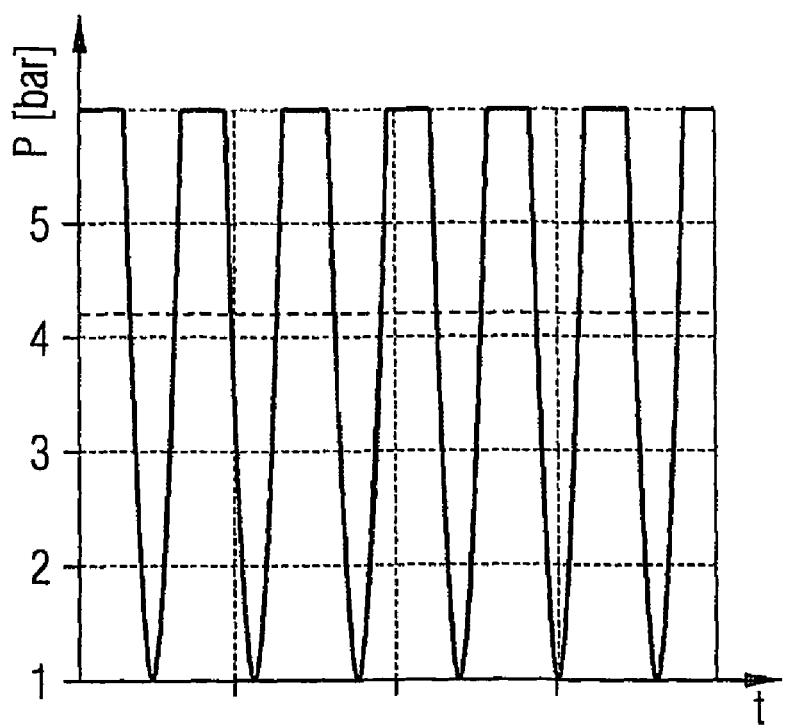
FIG. 3 shows a time-trace of the fuel pressure in the low-pressure zone when the fuel pressure damper is faulty.

FIG. 3 shows a time-trace of the fuel pressure in the low-pressure zone with a faulty fuel pressure damper. Here, the pressure fluctuates about its mean value with a very much greater amplitude, which leads to deep pressure troughs and high-pressure peaks, and hence to functional impairment of the fuel injection system. The pressure peaks can be truncated by the overpressure limitation valve 30, shown in FIG. 1. However, this will not produce a satisfactory situation, because of the faulty fuel pressure damper 12.

The quantitative recognition of whether the pressure fluctuations exceed a permissible limiting value, hence resulting in a high probability of a fault in the fuel pressure damper 12, is explained below.

Figure 4:
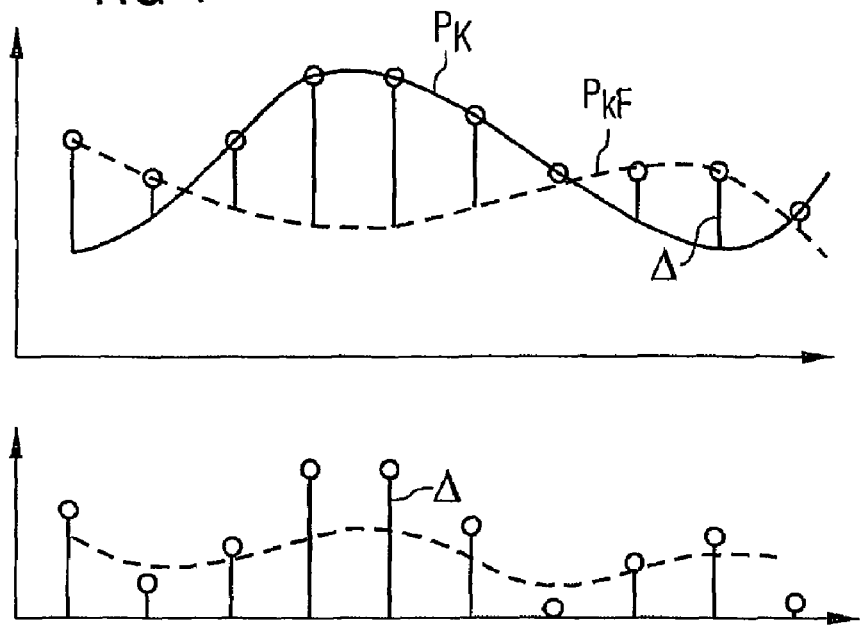
FIG. 4 shows an analysis which could be used in the context of the invention.

FIG. 4 shows two diagrams to explain an analysis which could be used in the context of the invention. The upper diagram plots an imaginary trace of fuel pressure against time. The line $p_K$ represents a trace of the pressure in the low-pressure zone 10. The line $p_{KF}$ represents a trace of the low-pass filtered pressure in the low-pressure zone 10. This low-pass filtering is preferably carried out in the electronic control unit 22, but can also be effected in other known ways. The difference $\Delta$ between the two curves $p_K$ and $p_{KF}$ is formed. The absolute magnitudes of this difference $\Delta$ are shown again in the lower diagram in FIG. 3.

From this filtering and the formation of the differences, one obtains a trace of values which can be compared with a selected absolute pressure threshold. In this way, the high-frequency component of the fuel pressure time-trace can be invoked as a criterion for the correct functioning of the fuel pressure damper 12.

Figure 5:
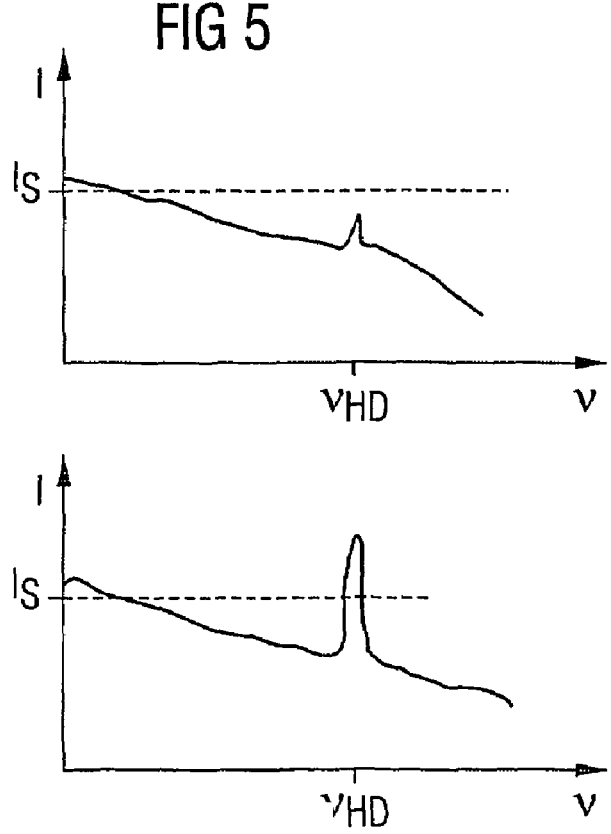
FIG. 5 shows two characteristic frequency spectra, one for defective operation of the fuel pressure damper and one for correct operation.

FIG. 5 shows two characteristic frequency spectra, respectively for the correct operation of a fuel pressure damper and for its defective operation. The upper diagram plots the intensity I of the signal supplied by the fuel pressure sensor 14 against the frequency v, assuming correct functioning of the fuel pressure damper 12. The frequency spectrum then has arbitrary frequency components at low frequencies, which are not considered further in the present context, which in general reflect low-frequency pressure fluctuations in the low-pressure zone 10. In addition, high frequencies are superimposed on the frequency spectrum, one of these at $v_{HD}$ being shown by way of example. These frequency peaks can be produced by the operation of the high-pressure pump 16 at a frequency of $v_{HD}$. If there is adequate fuel pressure damping, the intensity at $v_{HD}$ is low, and in particular lies below a predefined threshold $I_S$. The criterion for the correct operation of the fuel pressure damper is thus that the value lies below this threshold $I_S$.

In contrast to the upper frequency spectrum in FIG. 5, the lower frequency spectrum is based on defective fuel pressure damping. This can be recognized from the intensity threshold $I_S$ being exceeded.

The threshold values which are used in the analyses shown in FIGS. 4 and 5 can be adapted for the operating conditions in each case, with the possibility of dynamic adaptation depending on the operating conditions of the internal combustion engine. Thus, for example, the operation of high-pressure injection systems at low load involves fuel being fed back from the high-pressure zone at high rates, because of which there are higher pressure fluctuations, so that in this case the threshold values can be set to be less critical.

Figure 6:
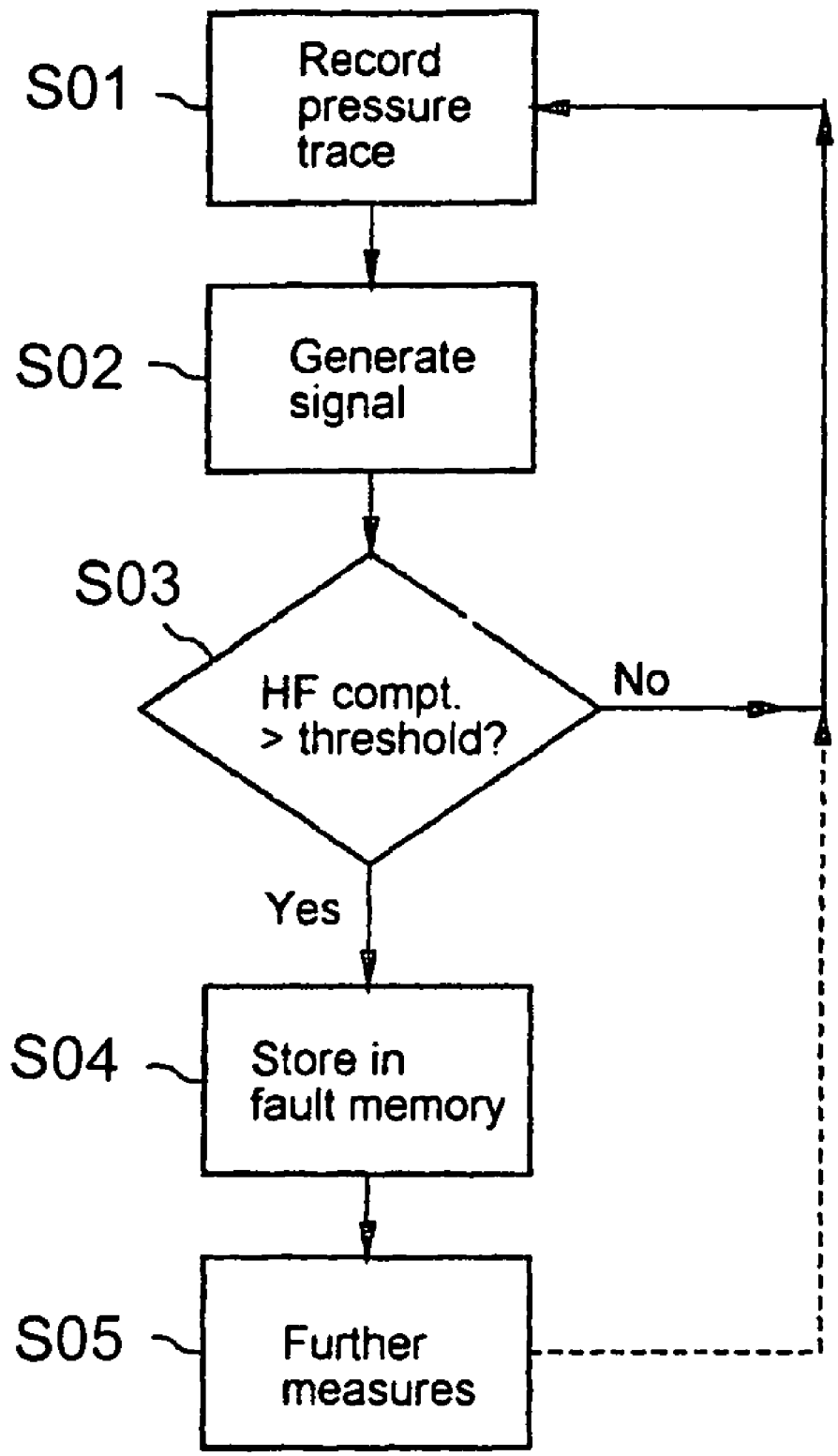
FIG. 6 a flow diagram to explain a method in accordance with the invention.

FIG. 6 shows a flow diagram to explain a method in accordance with the invention. In step S01, the time-trace of the pressure in the low-pressure zone is sensed. On the basis of this pressure sensing, step S02 generates a signal which characterizes the time-trace of the pressure in the low-pressure zone. In step S03, a high-frequency component of the signal generated in step S02 is analyzed, and in particular is compared with a threshold value. If this high-frequency component lies below a prescribed threshold value, then the fuel pressure damper is working correctly, and the method returns to step S01. However, if the high-frequency component exceeds the threshold value, then in step S04 an entry is made in the fault memory, recording that there is a fault in the fuel pressure damper. In step S05 further measures can be initiated, for example for damage limitation. From either step S04 or S05, as applicable, it is possible to return into the monitoring routine, whereby it also is conceivable that after a malfunction has been detected one or more times the monitoring of the fuel pressure damper in accordance with the invention is terminated.

The invention can be summarized as follows. The low-pressure zone 10 of a fuel injection system is equipped with a fuel pressure damper 12 to smooth out pressure fluctuations, in particular pressure fluctuations such as are produced by the operation of a high-pressure fuel pump 16 downstream from the low-pressure zone 10. In the low-pressure zone 10, the pressure/time trace is sensed by a pressure sensor 14. Using high-frequency components of this pressure/time trace sensed by the pressure sensor 14 it is possible to determine whether the fuel pressure damper 12 is working correctly.

The features of the invention, as disclosed in the description above, in the drawings and in the claims, may be essential either individually or in any desired combination for the realization of the invention.

The invention claimed is:

1. A device for the detection of faults in a fuel injection system, comprising:
   a low-pressure zone;
   a fuel pressure damper located in the low-pressure zone; and
   at least one pressure sensor for sensing the pressure which prevails in the low-pressure zone, wherein
   a malfunction of the fuel pressure damper is recognized by reference to a high-frequency component of a first signal, supplied by the pressure sensor, which characterizes the pressure/time trace in the low-pressure zone.

2. The device in accordance with claim 1, wherein
   the first signal is low-pass filtered to enable a low-pass filtered second signal to be generated;
   a third signal is generated as an absolute difference between the first signal and the second signal; and
   the third signal is compared with a prescribed threshold value, whereby if the threshold value is exceeded it is concluded that there is a malfunction of the fuel pressure damper.

3. The device in accordance with claim 1, wherein
   the first signal is subjected to a Fourier transformation to generate a frequency spectrum which corresponds to a time-trace of the first signal, and
   the high-frequency component of the frequency spectrum is compared with at least one prescribed threshold value, whereby if the threshold value is exceeded it is concluded that there is a malfunction of the fuel pressure damper.

4. The device in accordance with claim 1, wherein the fuel injection system has a high-pressure fuel pump and a high-pressure zone with a fuel store.

5. The device in accordance with claim 1, wherein a malfunction of the fuel pressure damper is recognized can be stored in a fault memory.

6. The device in accordance with claim 1, wherein the recognition of a malfunction of the fuel pressure damper is effected taking into account operating conditions in an internal combustion engine.

7. The device in accordance with claim 1, wherein the fuel injection system is provided with at least one control unit, in which at least one of the above-mentioned analyses is performed.

8. The device in accordance with claim 1, wherein the device has an interface for installation in a vehicle.

9. The device in accordance with claim 1, wherein the device has an interface for installation in a diagnostic facility which is separate from the vehicle.

10. A method for recognizing faults in a fuel injection system in which the fuel injection system has a low-pressure zone, a fuel pressure damper located in the low-pressure zone, and at least one pressure sensor for sensing the pressure which prevails in the low-pressure zone, comprising:
   sensing a pressure/time trace in the low-pressure zone;
   generating a first signal which characterizes the pressure trace in the low-pressure zone; and
   analyzing a high-frequency component of the first signal in order to recognize from it a malfunction, of the fuel pressure damper.

11. The method in accordance with claim 10, wherein
   the first signal is low-pass filtered, so that a low-pass filtered second signal is generated,
   a third signal is generated as an absolute difference between the first signal and the second signal, and
   the third signal is compared with a prescribed threshold value, whereby if the threshold value is exceeded it is concluded that there is a malfunction of the fuel pressure damper.

12. The method in accordance with claim 10, wherein
   the first signal is subjected to a Fourier transformation, to generate a frequency spectrum corresponding to the time-trace of the first signal, and
   the high-frequency component of the frequency spectrum is compared with at least one prescribed threshold value, whereby if the threshold value is exceeded it is concluded that there is a malfunction of the fuel pressure damper.

13. The method in accordance with claim 10, wherein the fuel injection system has a high-pressure fuel pump and a high-pressure zone with a fuel store.

14. The method in accordance with claim 10, wherein a malfunction which is recognized in the fuel pressure damper is stored in a fault memory.

15. The method in accordance with claim 10, wherein the recognition of a fuel pressure damper malfunction is effected taking into account the operating conditions of the internal combustion engine.

16. The method in accordance with claim 10, wherein the fuel injection system has at least electronic one control unit assigned to it, in which at least one of the above-mentioned analyses is performed.

17. The method in accordance with claim 10, wherein emergency measures are initiated if a malfunction of the fuel pressure damper is detected.

18. A vehicle with a device for recognizing faults in a fuel injection system, the device comprising:
- a low-pressure zone;
- a fuel pressure damper located in the low-pressure zone; and
- at least one pressure sensor for sensing the pressure which prevails in the low-pressure zone, wherein
- a malfunction of the fuel pressure damper is recognized by reference to a high-frequency component of a first signal, supplied by the pressure sensor, which characterizes the pressure/time trace in the low-pressure zone.

19. A diagnostic facility with a device, for recognizing faults in a fuel injection system on a vehicle, which is located off the vehicle, the device comprising:
- a low-pressure zone;
- a fuel pressure damper located in the low-pressure zone; and
- at least one pressure sensor for sensing the pressure which prevails in the low-pressure zone, wherein
- a malfunction of the fuel pressure damper is recognized by reference to a high-frequency component of a first signal, supplied by the pressure sensor, which characterizes the pressure/time trace in the low-pressure zone.

* * * * *